Inventor
Walter T. Gollwitzer
By Wallace and Cannon
Attorneys

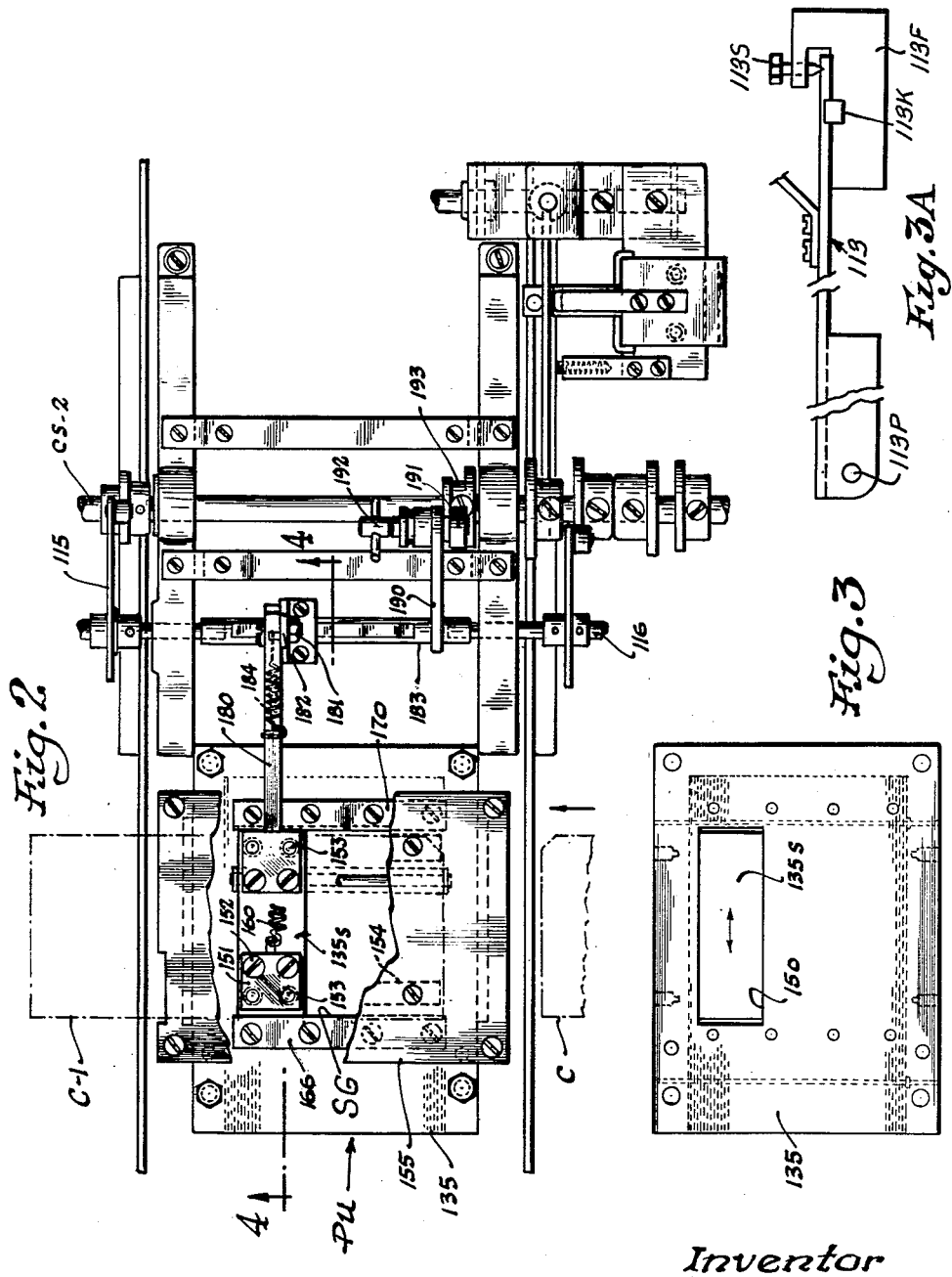

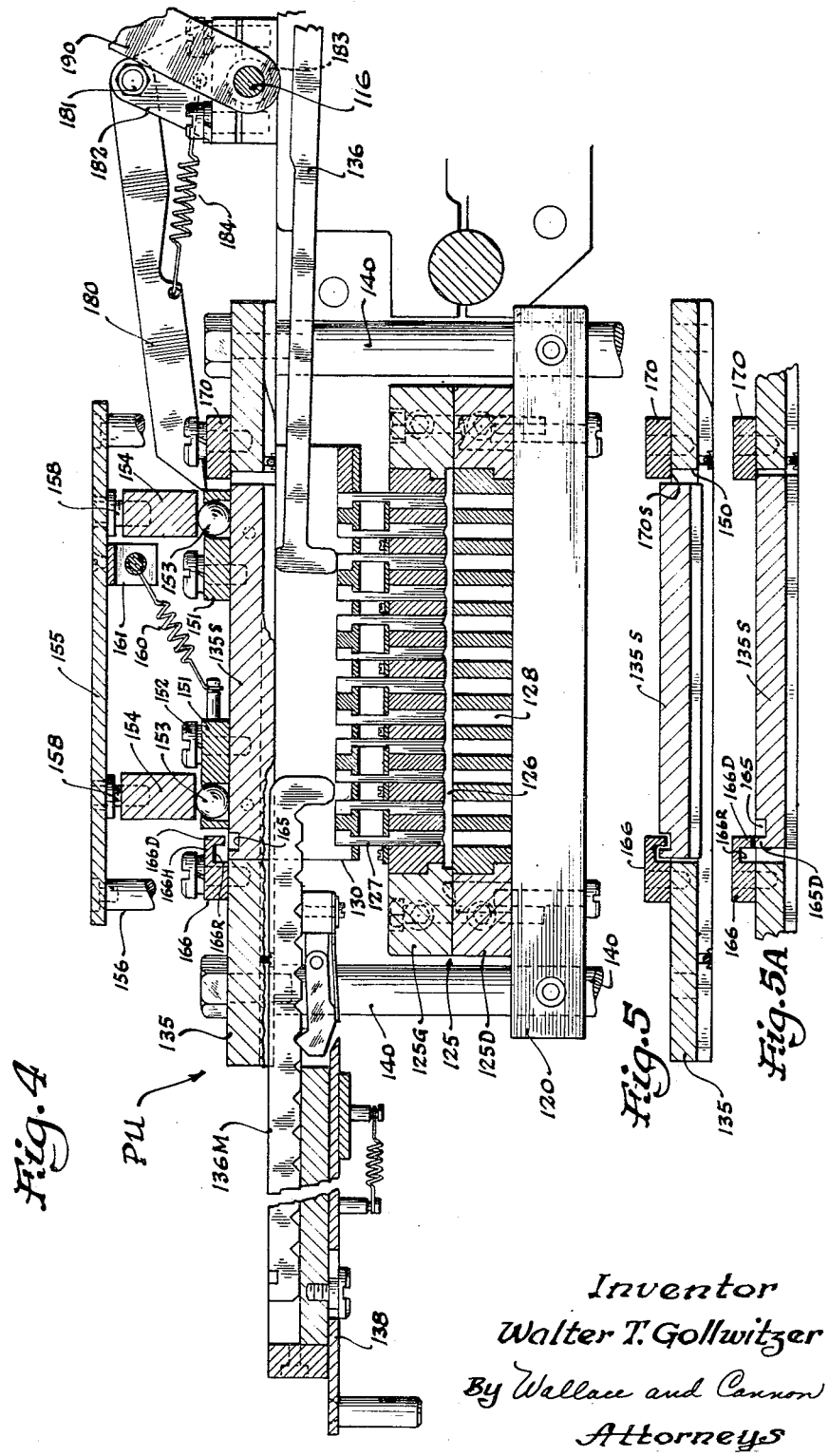

Oct. 16, 1956 W. T. GOLLWITZER 2,766,827
MACHINES FOR PRODUCING PUNCHED BUSINESS INSTRUMENTS
Filed Aug. 24, 1955 9 Sheets-Sheet 4
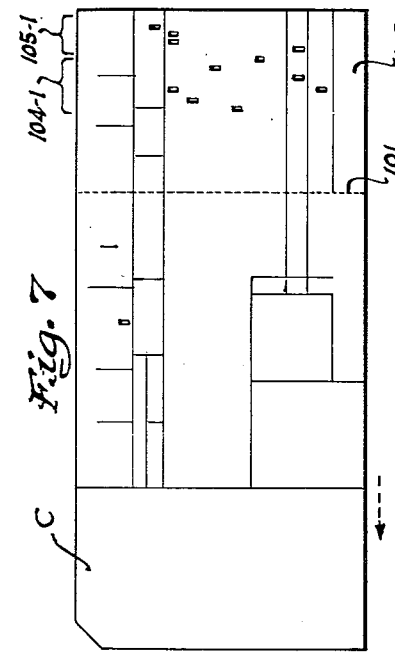
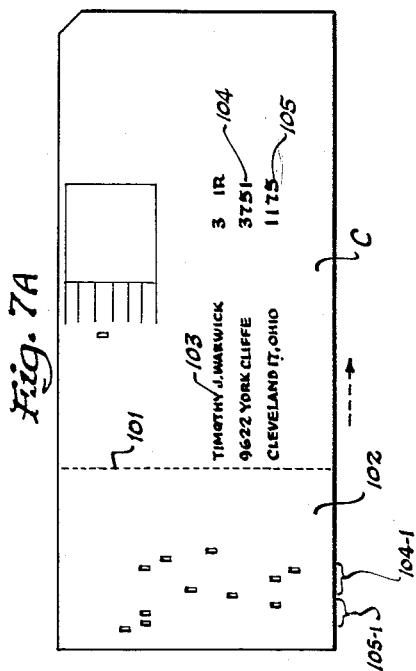
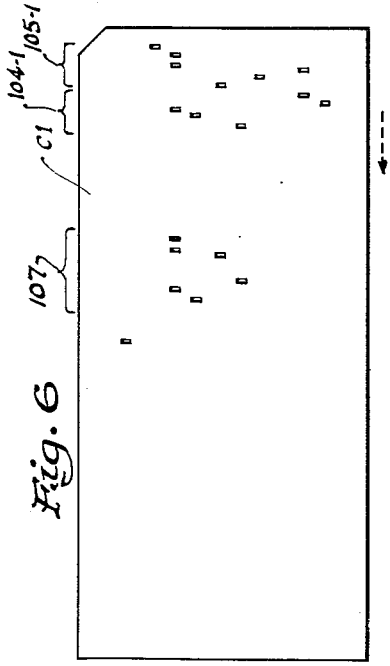
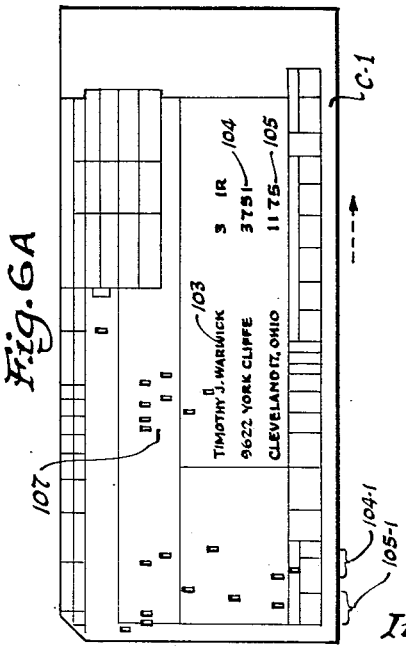
Inventor
Walter T. Gollwitzer
By Wallace and Cannon
Attorneys

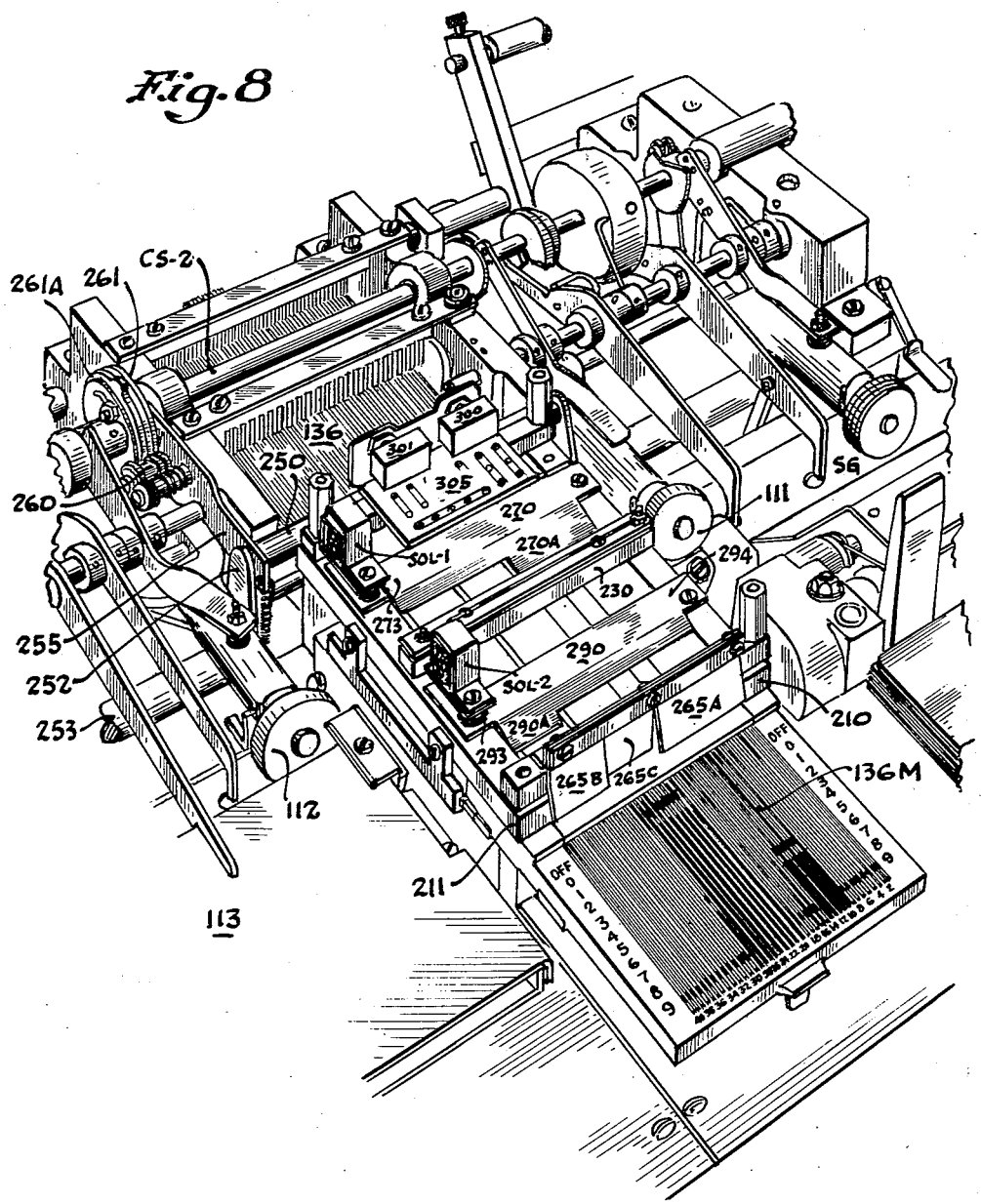

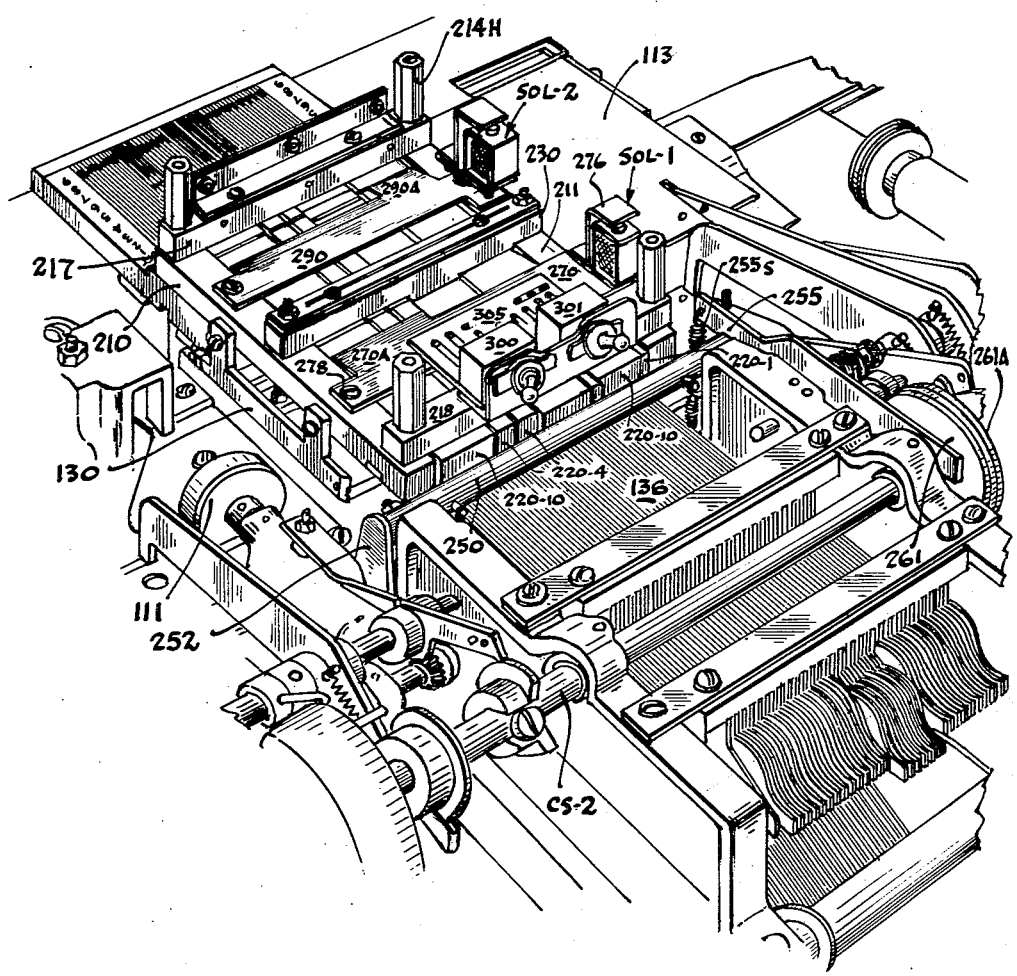

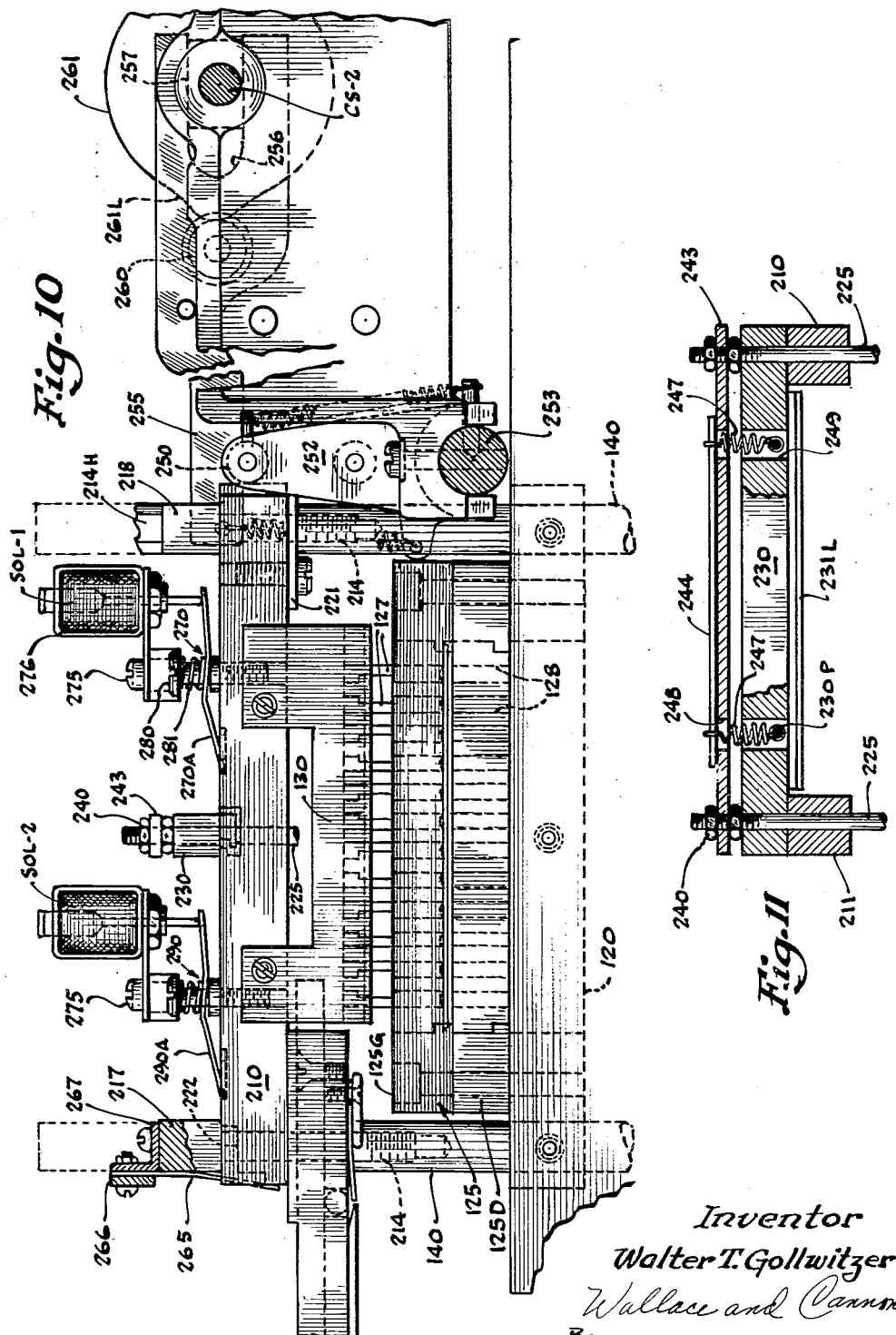

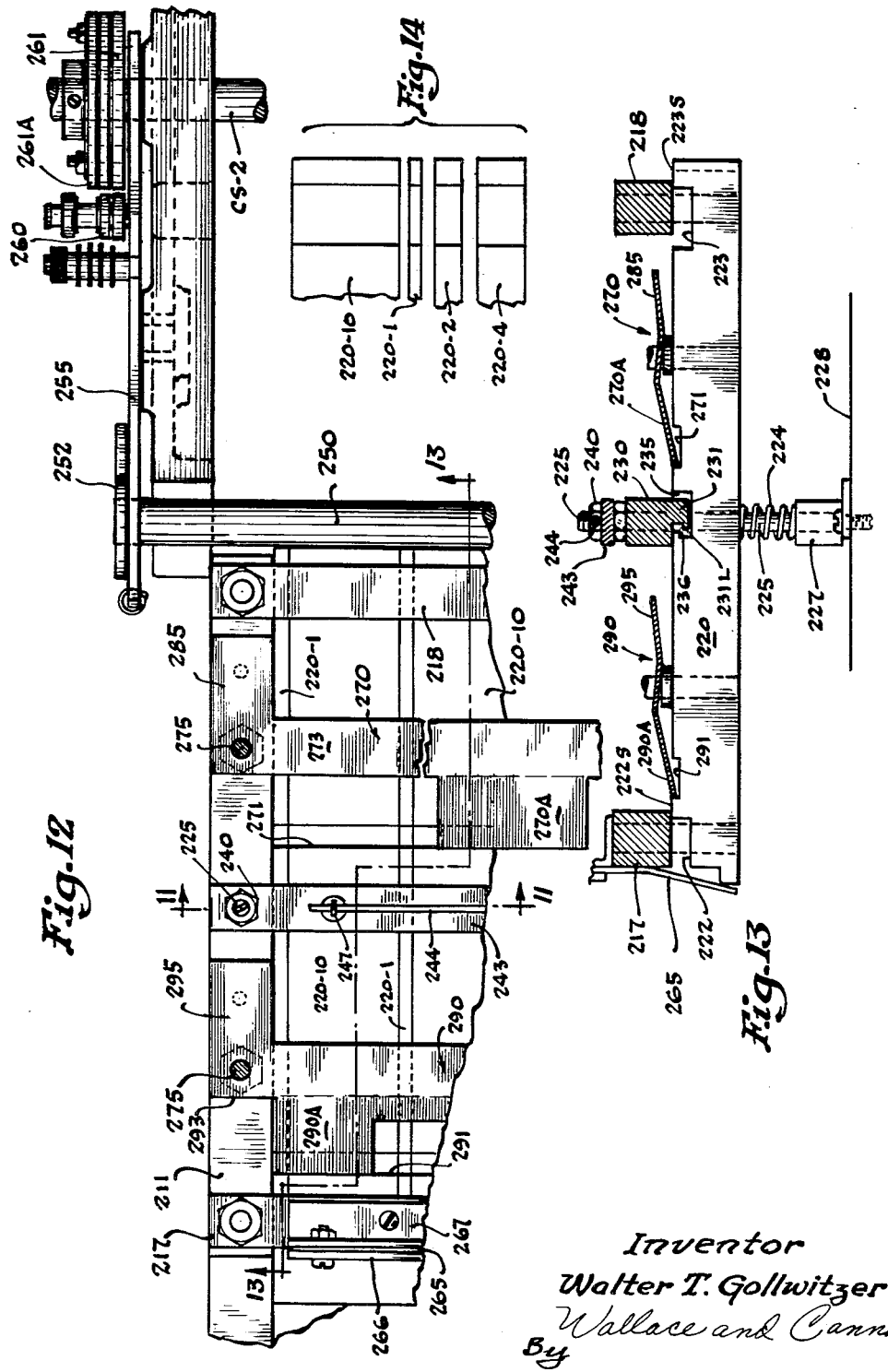

Oct. 16, 1956 W. T. GOLLWITZER 2,766,827
MACHINES FOR PRODUCING PUNCHED BUSINESS INSTRUMENTS
Filed Aug. 24, 1955 9 Sheets-Sheet 9
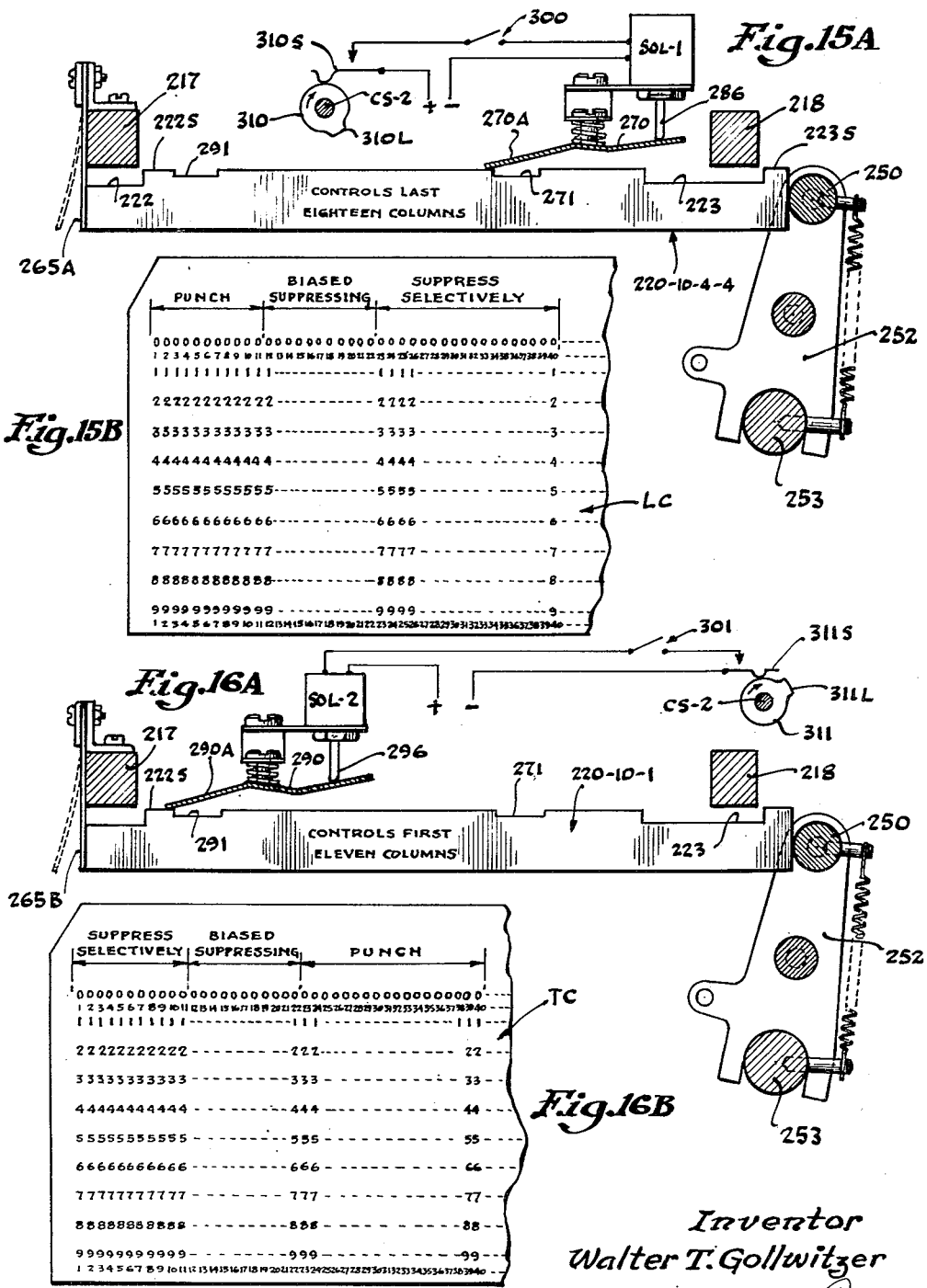
Inventor
Walter T. Gollwitzer
By Wallace and Cannon
Attorneys United States Patent Office 2,766,827
Patented Oct. 16, 1956

2,766,827

MACHINES FOR PRODUCING PUNCHED BUSINESS INSTRUMENTS

Walter T. Gollwitzer, Euclid, Ohio, assignor to Addressograph-Multigraph Corporation, Cleveland, Ohio, a corporation of Delaware Application August 24, 1955, Serial No. 530,235

17 Claims. (Cl. 164—111)

This application is a continuation-in-part of my forfieted application Ser. No. 259,823 filed December 4, 1951.

This invention relates to punching mechanism of the kind used in producing data-representing perforations in business instruments such as card checks, bills and the like.

Where punching apparatus is utilized to produce data-representing perforations in business instruments such as card checks, bills and the like, such punching apparatus is usually set up automatically with respect to each business instrument or group of business instruments that is to be produced, and it often happens that such apparatus is used to produce related instruments such as a check and an accounting card corresponding to such check. In other instances this same circumstance may occur in the preparation of utility bills or the like wherein a bill and a return stub are produced and are sent to the customer, while a related accounting card is produced for each such bill and stub combination. In instances such as the foregoing, it is often desirable to include information on the accounting card which is not included on the bill or check, but since the punching apparatus must remain in its set condition for the performance of all of the related punching operations on the check, the stub, and the accounting card, such elimination of certain of the punched data from one or more of the related business instruments involves the suppression of the punching operation with respect to such data that is to be suppressed or eliminated. The primary object of the present invention is to enable such suppression of the punching action in certain of the fields or orders of a punching unit to be readily and easily accomplished.

Another and related object is to enable such punch suppression to be obtained in a way that lends itself to ready and easy control in an automatic machine for producing business instruments.

More specifically, it is an object of the present invention to afford a novel operating ram construction in a punching unit whereby certain portions of the ram may be rendered ineffective when it is desired to suppress certain punching operations of the mechanism, and a related object is to afford a supplementary ram element in such a punching unit that may be connected to or disconnected from the main ram in simple and expeditious manner.

Other specific objects of the present invention are to enable settable multi-column card punching mechanism to be suppressed at different times in selected of different columns and to enable this to be accomplished automatically to impart different orders to successive cards as to the data punched therein, and to provide for flexibility in predetermining and choosing the particular columns that are to be adapted for suppression.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be used and structural changes may be made as desired by those skilled in the art without departing from the present invention and the purview of the appended claims.

In the drawings:

Fig. 2 is a fragmentary plan view of the punching unit of Fig. 1;

Fig. 3 is a plan view of the ram plate and supplementary ram plate shown in Fig. 2 of the drawings;

Fig. 4 is a fragmentary vertical sectional view taken substantially along the line 4—4 of Fig. 2;

Figs. 5 and 5A are similar views showing the supplemental ram plate in its ineffective and effective relationships;

Fig. 6 is a rear face view of an accounting card produced by the present mechanism;

Fig. 6A is front face view of an accounting card of Fig. 6;

Fig. 7 is a rear face view of a connected bill and return stub card that is related to the accounting card of Fig. 6;

Fig. 7A is a front face view of the connected bill and return stub shown in Fig. 7;

Fig. 8 is a front perspective view of a punching unit embodying punch suppressing means of modified form;

Fig. 9 is a rear perspective view of the unit shown in Fig. 8;

Fig. 10 is a side elevation of the modified unit;

Fig. 11 is a sectional view as taken along the line 11—11 of Fig. 12;

Fig. 12 is a fragmentary plan view of the modified suppressing means;

Fig. 13 is a sectional view taken substantially on the line 13—13 of Fig. 12;

Fig. 14 is a fragmentary plan view of a set of interchangeable suppressor plates;

Fig. 15A is a schematic section showing a setting for punch suppression in selected columns;

Fig. 15B is a fragment of a card illustrating the relations afforded by a setting such as that shown in Fig. 15A;

Fig. 16A is a schematic section showing another setting for punch suppression in different selected columns compared to Fig. 15A; and Fig. 16B is a fragment of another card illustrating the relations afforded by a setting such as that shown in Fig. 16A.

Figure 1:
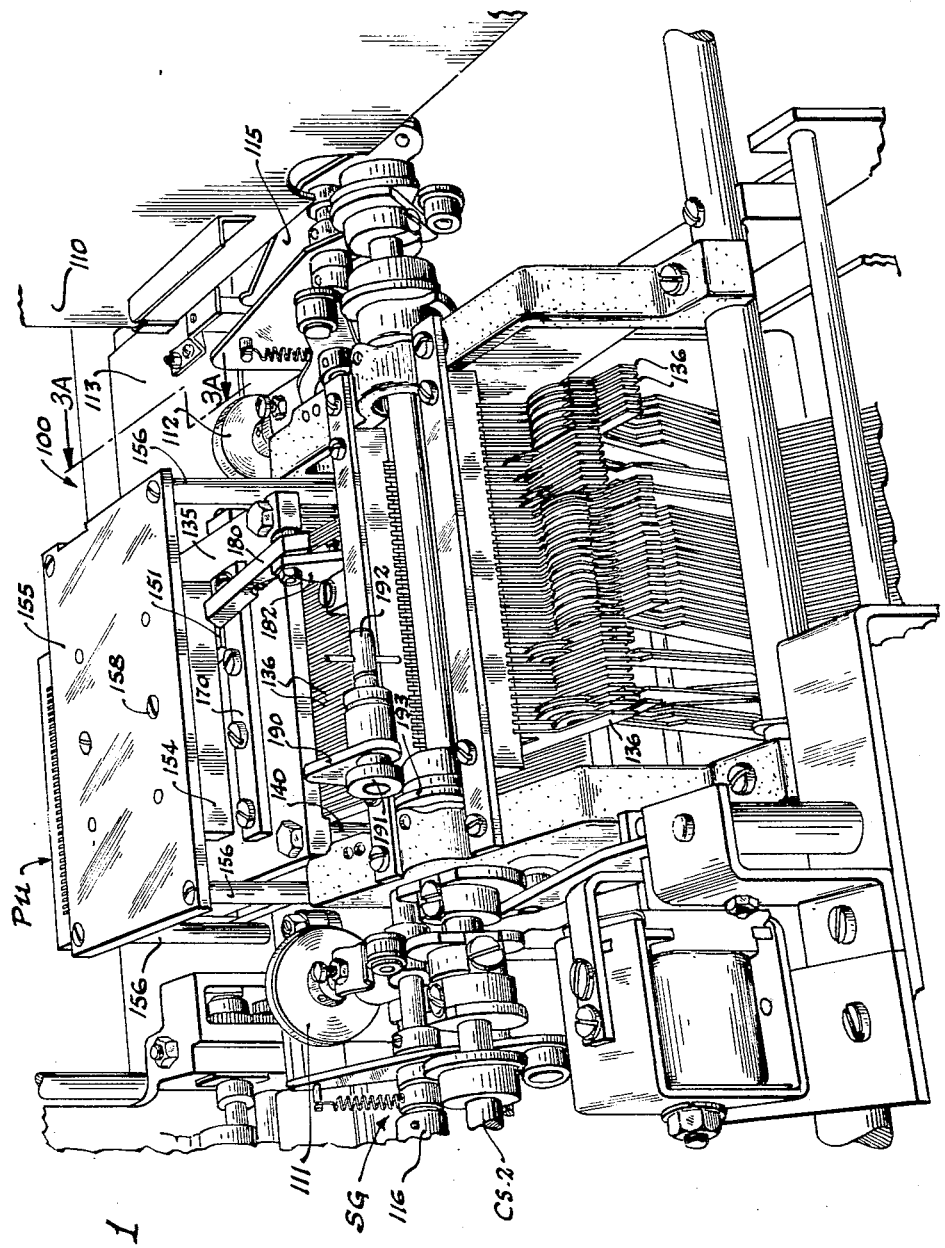
Fig. 1 is a rear perspective view of a punching unit embodying suppressing means embodying the features of the present invention.

For purposes of disclosure the invention is herein illustrated as embodied in a punch unit PU that is of the general character that is shown in my Patent No. 2,710,-406 patented June 7, 1955, and this punching unit is embodied in a machine 100 for producing business instruments, such machine being of the same general construction as the machine illustrated in my aforesaid patent.

The machine 100 is adapted to produce business instruments from and under control of individual printing and control devices that embody printing means and control means, and each business instrument may have a printed identifying impression formed thereon from the printing means of a printing and control device and may also have data-representing perforations formed therein by a punch unit under control of the control means of the same printing and control device. Thus, as shown in Figs. 6, 6A, 7 and 7A, the machine 100 may produce a card-type bill C and a related accounting card C-1, and for such work, the machine 100 is set for what is described in the aforesaid copending application as duplicate operation. As shown in Figs. 7 and 7A, the card-type bill C is of the usual Hollerith form, and in the present instance the card C has a weakened or perforated line 101 formed in spaced relation to its left hand end as illustrated in Fig. 7A to define an attached but readily separable end section which constitutes the remittance stub 102 that is intended to be returned to the issuing company with the remittance covering the amount of the bill. The accounting card C-1 is also of the usual Hollerith form, and the cards C and C-1 have a printed impression 103 formed thereon from the same printing device in the successive printing operations that are performed in a particular cycle of duplicate operation of the machine as described in my aforesaid copending application. It will be observed that printed impressions are also formed of identification numbers 104 and 105 on each of the cards C and C-1, and these identification numbers are also represented by data perforations 104-1 and 105-1 that are formed in each of the cards C and C-1. In this respect, it will be observed that the perforations 104-1 and 105-1 in respect to the card C are formed in the remittance stub 102 of this card so that the presence of these identification numbers in the remittance stub 102 enables an attached remittance to be credited to the proper account number.

In addition to the data represented by the perforations 104-1 and 105-1, the accounting card C-1 contains data representing perforations 107 which may be set up either manually or automatically in the punch unit PU. This data that is represented by the perforations 107 is often of such character that it is undesirable to include such data-representing perforations in the card C that is sent to a customer, and it is with the suppression of the punching operation in respect to the punches that form the perforations 107 that the present invention is concerned, as will be hereinafter explained in some detail.

The cards C and C-1 are fed in succession along the sheet guideway SG of the machine 100 as described in the aforesaid patent, and these cards come to rest successively at a punching unit PU and subsequently at a printing station that is defined beneath a printing head structure 110 that is shown on Fig. 1 of the present drawings. The cards are advanced along such printing device guideway by means including driven feed rolls 111 and 112 that are shown in Fig. 1 of the drawings, and when a card has moved into the throat of the punching unit PU, it is brought to rest by a stop finger structure that includes a stop finger rocker 113. The feed rollers 111 and 112 are raised and lowered at appropriate times in the machine cycle by means including cams fixed on a horizontal cam shaft CS-2 as described in my aforesaid patent, and this cam shaft CS-2 has cam means thereon which is effective to raise and lower stop finger rocker 113, this operation being attained through the medium of a transmitting lever 115 that is operated by the cam means on the shaft CS-2, and which lever is pivoted on a mounting shaft 116 that is located forwardly of the cam shaft CS-2. In this respect, it might be noted that the shaft 116 corresponds to the shaft 250 in my aforesaid patent.

The punching unit PU includes a stationary horizontal mounting and guiding plate 120 upon which a sectional punch block 125 is mounted in fixed relationship. This punch block comprises a lower die block 125D and an upper punch guiding block 125G and these two blocks are so formed and associated as to define a passage or throat 126 therebetween that is aligned with the sheet guideway SG so that a card C may be moved endwise into and through this throat. A series of twelve punches 127 are mounted in the guide block 125G in each column in which perforations are to be formed, and these punches are aligned with die openings 128 in the die block 125D. The punches 127 are arranged to be retracted in upward direction by a stripper structure 130 as described in my aforesaid patent, and individually settable interposer means are afforded for selectively actuating any desired one of the punches 127 in any column through a downward or punching stroke. Such punch actuating means include an upper ram plate 135 that is adapted to be moved in a downward direction each time a punching operation is to be performed, and it also includes a plurality of settable interposers 136 and 136M that may be shiftably set to select the punch in each column for actuation. The interposers 136 or 136M serve as a motion transmitting means between the overlying ram plate 135 and the punch 127 with which the head of such interposer is aligned. As described in my aforesaid patent, the interposers 136M are adapted for manual setting and may be locked in their set positions by means of a locking plate 138. The interposers 136, on the other hand, are automatically set in each cycle of machine operation and are restored at the end of such cycle, and such setting may, so far as the present invention is concerned, be attained by any preferred control means such as the control means of the printing and control devices as described in my aforesaid patent.

When the machine is being operated in duplicate, as is required where two related cards are being printed and punched from and under control of a particular printing and control device, the punching unit PU is set up prior to the punching of the leading one of the two cards and is maintained in its set relationship until the punching of the second one of the two cards has been completed.

The ram plate 135 is rectangular in form, as disclosed in my aforesaid patent, and is actuated in a downward direction through its punching or punch-operating stroke by a plurality of operating rods 140 that extend upwardly through the stationary base plate 120 and are connected at their upper ends to the ram plate 135 at the corners thereof, and such rods 140 are actuated in unison in each punching cycle by means that are described in detail in my aforesaid patent.

As disclosed in my aforesaid patent, all of the punches 127 that have been selected by setting of interposers 136 or 136M are operated in each cycle of the ram plate 135, but under and in accordance with the present invention, means are afforded for suppressing or preventing the operation of the punching means in selected columns of the punching apparatus. In a broad sense, this result is attained by providing a supplemental ram plate that may be connected to, or disconnected from the main ram plate as desired, so that when the supplemental ram plate is connected to the ram plate 135, all of the set or selected punches will be operated, while in the event that the supplemental ram plate is disconnected from the main ram plate 135, the punches in the selected columns of the punching unit will remain inactive or, in other words, will be suppressed.

Thus as shown in detail in Figs. 2, 3 and 4, the main ram plate 135 has an opening 150 formed herein, and this opening 150 is rectangular in form so as to overlie all of the punches in several selected columns of the punching unit. Within this opening 150, a supplemental ram plate 135S is disposed and, as herein shown, this supplemental ram plate 135S is of a length that is somewhat less than the length of the opening 150 so as to provide for limited endwise movement of the supplemental ram plate 135S within the opening 150. The supplemental ram plate 135S has a pair of ball retainer plates 151 fixed on its upper surfaces by means of screws 152 and as will be evident in Figs. 1, 2, and 4. These ball retainer plates are located adjacent to the opposite ends of the supplemental ram plate 135S. In each such retainer plate 151, a pair of bearing balls 153 are mounted and retained so that the upper edges or surfaces thereof are exposed above the plates 151, and these balls 153 are arranged to bear normally against a pair of positioning blocks 154 that are stationarily but adjustably mounted beneath a stationary horizontal plate 155. This plate 155 is carried by a plurality of vertical rods 156 that extend downwardly along opposite sides of the plate 135 and are anchored in a fixed relation at their lower ends on the base plate 120. The blocks 154 are arranged for vertical adjustment by means of adjusting screws 158 that are carried by the plate 155 and which are threaded at their lower ends into the blocks 154. A spring 160 extending angularly upwardly between the left hand block 151 and a bracket 161, as shown in Fig. 4, is arranged to urge the supplemental ram plate 135S upwardly and to the right in Fig. 4, thus to urge the supplemental ram plate 135S normally toward a connecting or motion-transmitting relationship with respect to the main ram plate 135 as will hereinafter be described.

As herein shown, the locking and unlocking of the two ram plates 135S and 135 is effected by the endwise shifting of the supplemental ram plate 135S. Thus it will be noted that near its left hand end, the supplemental ram plate 135S has a slot 165 formed therein parallel to such left hand end edge, and a transmitting block 166 is secured to the ram plate 135 along the left hand side of the slot 150. The transmitting block 166 has its right hand edge formed so as to project outwardly as at 166H over the slot 150 and the supplemental ram plate 135S, and then downwardly as at 166D and this defines a downwardly facing recess 166R to the left of the edge flange or downwardly projecting portion 166D. When the supplemental ram plate 135S is in its right hand or normal position as shown in Fig. 5A, the flange 166D overlies an upwardly facing flange 165D that is formed on the supplemental ram plate 135S to the left of the slot 165. On the other hand, when the supplemental ram plate 135S is in its left hand position, as shown in Fig. 5, the flange 166D is aligned with the slot 165 and the flange 165D is aligned with the slot 166R so that the parts may be shifted to the position or relation shown in Fig. 5 in a downward movement of the main ram plate 135.

At the right hand end of the slot 150, a transmitting plate 170 is fixed on the main ram plate 135, and the left hand edge of the transmitting plate 170 extends over or to the left beyond the right hand end edge of the opening 150 so as to afford a downwardly facing shoulder 170S. When the supplemental ram plate 135 is in its normal right hand position as shown in Fig. 5A, its right hand edge is arranged to underlie the shoulder 170S so that downward forces may be applied to this end of the supplemental ram plate 135S by the transmitting plate 170. On the other hand, when the supplemental ram plate 135S is in its left hand position, as shown in Fig. 5, it is out of alignment with respect to the shoulder 170S so that the transmitting plate 170 may move downwardly without transmitting movement to this end of the supplemental ram plate 135S.

With the construction thus afforded, the supplemental ram plate 135S is normally retained in its upper right hand position by the spring 160 so that the supplemental ram plate 135S is in effect locked to the main ram plate 135 and will be moved downwardly with the main ram plate 135 in a punching cycle thereof. When, however, it is desired to suppress punching in the columns to which the supplemental ram plate 135S is related, this suppression may be readily effected by shifting the supplemental ram plate in a forward or left hand direction to the position shown in Fig. 4, thereby to free the supplemental ram plate and permit downward punching movement of the main ram plate 135 independently of the supplemental ram plate 135S, as shown in Fig. 5. As herein shown, such forward displacement of the supplemental ram plate 135S is effected by motion transmitting means including a pawl 180 that is pivoted at 181 on an operating arm 182, such operating arm being fixed on a sleeve 183. The forward end or nose of the pawl 180, extends slidably over the transmitting bearing 170 and is arranged to engage the rear edge of the rear one of the ball-retaining blocks 151. A spring 184 acts on the pawl 180 to hold the forward end of the pawl 180 down and in engagement with the block 170, and thus, the forward end of the pawl 180 remains in proper alignment and in engagement with the block 151 despite up and down movements of the main ram plate 135.

The sleeve 183 is mounted on the shaft 116 as will be evident in Fig. 2 and at one end of the sleeve 183 an arm 190 is fixed. This arm 190 carries a cam roller 191 that is arranged on the arm 190 for axial adjustment by means of a mounting pin 192. This roller 191 may thus be adjusted axially into or out of engagement or alignment with an operating cam 193, and this operating cam 193 is fixed on the cam shaft CS-2. The cam 193 is arranged to shift the supplemental ram plate 135S to its released position of Fig. 4 in the portion of the cycle when the card C is located at punching station, and is further arranged to allow the supplemental ram plate 135S to return to its locked or effective position of Fig. 5A in that portion of the cycle when an accounting card C-1 is located at punching station. Thus the data perforations 107 are formed in the cards C-1, but punching operation in this field of the punch is suppressed in respect to the card C.

It is advantageous in multi-column punching apparatus of the kind described above to be able to suppress certain columns of the selected punches in plurality of alternative relations with regard to alternative ones of the cards fed through the machine, whereby particular relations of this kind can be determined upon beforehand and the punch mechanism then arranged to operate automatically under such predetermined conditions for selective punch suppression. This form of the invention is illustrated in detail in Figs. 8 to 16, and inasmuch as the punch mechanism and the machine in which it is embodied as aforesaid, apart from the specific means of controlling the punch operations as will be described, are similar to what has been set forth hereinabove, certain of the reference characters in the preceding figures have been carried over into Figs. 8 to 16 so that what will be described below may be readily associated with what has been described above by way of basic or fundamental machine structure.

Thus, as shown in Figs. 8, 9, and 10, interposers 136 and 136M are again adapted to be automatically, or manually, set, selectively with respect to the heads of the punches 127, Fig. 10, which are arranged in columns to cooperate with the die openings 128 therebelow to punch data in to the tabulating cards. Vertical impacts are delivered to the interposers in horizontal set position in the several columns by means including vertical operating rods 140, Fig. 10, and after a particular punch operation has been performed in this manner the punches are then restored or lifted by the restoring or so-called punch stripping structure 130. When the machine is set for so-called duplicate operation, one setting of the interposers is held for two successive cards, the punches that were active on the first card being restored so as to be operative in the original selection on the next card.

In this instance, parallel, spaced apart tie bars 210 and 211, Figs. 8 and 9, constituting part of the ram structure, are formed at opposite ends with openings through which relatively large fastening screws 214, Fig. 10, are passed into corresponding tapped openings formed in the upper ends of the operating rods 140, and interposed between the heads 214H, Fig. 9, of these fastening screws and the tie bars 210 and 211, are a pair of forward and rearward parallel cross heads 217 and 218. It will be seen from the foregoing that during downward movement of the operating rods 140 these tie bars and cross heads will advance downwardly in unison, and during such downward movement those of the punches 127 having an interposer as 136 in a set position will be operated, except in those columns wherein punch suppression occurs as will be explained.

Punch operating movement, that is, downward movement of the cross heads acting as a ram, is normally imparted to those of the selected, that is, punches having an interposer in set position by shiftable, plates or blocks 220 which normally are in position between and parallel to the tie bars 210 and 211 to transmit punch operating movement of the cross heads 217 and 218 directly to the heads of the interposers as 136 in set position. Under the present invention, the plates 220 serve a dual purpose manifested by a normal position as aforesaid and a rearwardly shifted or punch suppressing position as will be described, and in this connection it is to be pointed out that the plates 220 are furnished in different widths machined accurately to the column dimensions of conventional punch cards of the kind shown in Figs. 15B and 16B. Thus, as is well known, cards of this kind are capable of being punched at one of ten or more positions in eighty columns, and in the present instance the punching mechanism is arranged to be operative on the first forty columns as indicated in Figs. 15B and 16B. Accordingly, the plates 220 embodied in the punching mechanism will have a total width of forty columns, and within this width there will be several such plates of varying width as will now be described.

The plates 220 are preferably furnished in ten, four, two, and one column widths as indicated at 220–10, 220–4, 220–2, and 220–1 in Fig. 14, since these afford advantageous combinations for spanning a selected number of punch columns. Thus, with reference to the fragmentary view in Fig. 12, it will be apparent that the punch mechanism there shown includes at least two one column plates 220–1 and two ten-column plates 220–10 constituting a total of twenty-two columns. This, however, is for purposes of illustration and understanding, and more detailed explanations of the actual punch-actuating and punch-suppressing relations with respect to the plates as 220 will be described below in regard to two typical situations involving a pair of cards entering the punching station one after the other.

The plates 220 extend from front to rear between the cross heads 217 and 218 which span the plates 220 at the front and rear ends thereof. The outermost ones of the plates 220 respectively lie adjacent the inner sides or faces of the tie bars 210 and 211, so that the tie bars in part serve as guides. Bottom portions of the plates 220 repose on a horizontal guide block 221, Fig. 10, that is secured to the underside of the tie bars 210 and 211 at the rear thereof, and a like block is afforded for the plates 220 at the front of the tie bars 210 and 211.

At the end corresponding to the cross head 217, each plate 220 is provided with a recess 222 across the width thereof, and at the opposite end each plate 220 is formed with another such recess 223. Normally, the plates 220 are positioned so that the recesses 222 and 223 are slightly out of alignment with respect to the cross heads 217 and 218, and in such non-aligned position front and rear shoulders 222S and 223S thereof are disposed directly beneath and in engagement with portions of the cross heads 217 and 218. Therefore, so long as the plates 220 are in a normal position as aforesaid the cross heads 217 and 218 will be effective to drive the plates 220 downward when the rods 140 are operated, and this, as was mentioned, will transmit the force of the ram to the set of interposers. In other words, for purposes of understanding, and assuming that the punch actuators as 136 have been set in all forty columns of the card punching mechanism, downward movement of the cross heads will normally be effective to cause a card at the punching station to be punched in forty columns, these being the forty columns shown for the cards in Figs. 15B and 16B. If however, a plate 220 is shifted rearwardly as viewed in Fig. 10 to align the recesses 222 and 223 with the cross heads of the ram, then the cross heads will simply seat in the recesses 222 and 223 during operation of the ram and the punches, even though selected, will be suppressed in the columns corresponding to such a shifted plate 220. This condition is illustrated in Figs. 15A and 16A, and more will be said in this connection below.

The ram structure afforded by the cross heads is normally biased in an upper or ineffective position by vertically acting coil springs 224, Fig. 13, and the front and rear blocks as 221 hold the plates 220 up. These springs are disposed about corresponding vertical guide shafts 225 that project downwardly from medial portions of the tie bars 210 and 211, and the springs 224 thus afforded are under compression between the undersides of the tie bars 210 and 211 and blocks as 227 that are anchored to a bed plate 228 of the machine.

The guide rods 225 on which the springs 224 are disposed extend upwardly beyond the tie bars 210 and 211. A laterally extending holding bail 230 for the plates 220 is mounted at either end on the rods 225 so as to span the tie bars 210 and 211, opposite ends at the bail 230 resting on medial portions of the upper faces of the tie bars as shown in Figs. 11 and 12. The bail 230 is formed with a downwardly extending projection 231 at the lower edge, and the projection 231 includes a forwardly extending lip 231L. At their medial portions, the plates 220 are each provided with aligned recesses 235 into which the projection 231 on the bail 230 is adapted to extend. The recesses 235 each include forwardly extending under-cut portions 236 of uniform dimension adapted to receive the lip 231L, and which provide shoulders 236 adapted to overhang the lip 231L for a purpose to be mentioned.

Spaced above the bail 230, Fig. 11, by adjustable nuts 240 on the exposed ends of the shafts 225 is a stationary support plate 243. Resting on the support plate 243 is a rod 244, and suspended from the rod 244 are a pair of spaced apart coil springs 247. The coil springs 247 extend downwardly through registered openings 248 and 249 in the plate 243 and the bail 230, and the lower ends of the springs 247 are anchored to pins 230P, Fig. 11, mounted in the bail 230. When the unsuppressed plates 220 are driven by the ram in a punch operating movement as described above, the shoulders 236 of these plates miss the lip 231L and operate the set interposers. When the cross heads are restored after the unsuppressed punches selected by the interposers 136 have been driven, the plates 220 are likewise restored or lifted by the blocks as 221 so as to be relieved from engagement with the interposers in set position. If a plate as 220 is shifted rearwardly to suppressed position as mentioned, the shoulder 236 overhangs the lip 231L further assuring non-punching operation of the shifted plate.

The plates 220 are held in normal position by a horizontal release bail 250 which, as shown in Figs. 9 and 10, normally engages the aligned rear ends of the unshifted plates 220 spanning the forty columns of punches. The bail 250 is carried at either end by a vertical arm 252, and at their lower ends these arms are bifurcated so as to embrace a mounting shaft 253, Fig. 10, affording a pivot for the arms 252.

The bail 250 is controlled in part by a horizontal operating arm 255 which extends forwardly from the main cam shaft CS-2 of the machine mentioned above. The operating arm 255 at the end opposite the bail 250 is bifurcated, Fig. 10, to afford a rearwardly opening slot 256 which is adapted to embrace a guide block 257 coaxial with the cam shaft CS-2. The block 257 supports and guides the arm 255 for reciprocation under conditions to be mentioned.

At the end corresponding to the bail 250, the operating arm 255 is formed in the lower edge with a downwardly opening recess which, as shown in Fig. 10, embraces one end of the bail 250. The end of the arm 255 projects beyond the bail 250, and the arm 255 is releasably held down on the bail 250 by a spring 255S, Fig. 9, such affording an overload release in the event of a jam.

Intermediate the ends thereof, the operating arm 255 is provided with a cam follower 260 which is associated with a cam 261 mounted on the main cam shaft CS-2 of the machine. The cam 261 is formed with an abrupt lobe 261L of relatively short arc, and normally the lobe 261L is effective on the follower 260 to hold the bail 250 in the normal position shown in Fig. 10. However, shortly after the commencement of a cycle of operation of the machine, manifest in rotation of the cam shaft CS–2, the lobe 261L rotates past the follower 260, and this releases the bail 250 to allow selected of the plates 220 to shift rearwardly in a way now to be described.

At their ends opposite the bail 250, the plates 220 are engaged by a set of relatively strong leaf spring 265, Figs. 8 and 10. Those springs are afforded in predetermined widths by slitting a single plate of spring steel at appropriate intervals, and the significance of such widths will be apparent from the description to follow. The springs 265 thus afforded are normally under tension so as to normally tend to urge the plates 220 rearwardly, and such tension is set up by the bail 250 acting on the rear ends of the plates 220 to press the front ends of the plates 220 against the springs 265. This is a held or locked condition as will be mentioned.

The upper edge of the plate affording the leaf springs 265 is clamped by a clamp 266 to the upstanding arm of an elongated angle bracket 267 which in turn is carried by the front cross head 217.

As described in my Patent No. 2,710,406 the machine may be set for duplicate operation, and under this circumstance two tabulating cards are adapted to be punched at the punching station with identical data determined by the setting of the interposers, which is to say that after the selected punches have been operated on one card these are then stripped or restored by the stripper 130 to reestablish the original selection determined by the interposers in set position, the interposers remaining in set position so that the next card in effect will be punched with the same data punched in the first card. After each such duplicate operation, the interposers are restored and are adapted to be re-set in new positions as described in Patent No. 2,710,406 for punching different data in the next set of what may be termed "duplicate" or paired cards. In other words, in duplicate operation of the machine of Patent No. 2,710,406 a particular setting for the interposers will be maintained for every two succeeding cards.

However, there are situations where not all of the data punched in the first or leading one of such pair of cards is to be punched in the trailing or second one of such pair of cards. Thus, for example, it may be that a leading card LC, Fig. 15B, is to be punched only in the first eleven of the forty columns as indicated in Fig. 15B, punching being suppressed in the remaining columns where there may be otherwise active interposers for activating corresponding punches. Likewise, it may be that the second or trailing one of such cards TC, Fig. 16B, is to be punched only in columns twenty-three to forty inclusive with the otherwise active punches in the first twenty-two columns being suppressed. It will be recognized from this that for the cards LC and TC there are columns common to both that are suppressed in each instance, these being the eleven intermediate columns twelve to twenty-two inclusive, and in fact this is the setting shown in Figs. 8 and 9 as will be mentioned. Such represents a typical alternate operation at the punching station for alternate cards in the present instance, and such alternate operation is controlled automatically as will now be described.

Thus, punching of the leading card LC is to be suppressed in the last eighteen columns, and to enable this to be accomplished a ten and two four column plates 220 as indicated at 220–10–4–4 in Fig. 15A are afforded for these last 18 columns. The plates 220 thus afforded for spanning the last eighteen columns of interposers and punches are normally locked or held in a punch operating position by an elongated control plate 270 having a holding pawl 270A, Figs. 8 and 15A, of a width to span the three plates 220 that are adapted to control punch suppression in the last eighteen columns. Such holding action is attained by forced engagement of the pawl 270A in aligned notches 271 that are formed in the upper faces of the plates 220 rearwardly of the plate restoring bail 230.

As shown in Figs. 8 and 12, the pawl 270 includes an arm 273 which extends laterally from the pawl 270A in the direction of the tie bar 211, and the end of this arm 273 is formed with an opening for receiving the shank of a fastening screw 275 which is anchored in and extends upwardly from the tie bar 211. The screw 275 serves also to position a shield 276, Figs. 9 and 10, about a solenoid SOL–1 which controls operation of the lock plate 270 as will be described. Mounted on the shank of the screw 275 between the horizontal mounting flange of the shield 276 and the arm 273 of the plate 270 is a coil spring (not shown) serving to hold the pawl 270A firmly down in the aforementioned aligned notches 271. In like manner, the plate 270 includes at the opposite end a relatively short arm 278, Figs. 8 and 9, having an opening therein enabling the arm 278 to be mounted on the shank of a screw 280, Fig. 10, which extends upwardly from the tie bar 210. Interposed between the head of the screw 280 and the arm 278 of the plate 270 is a coil spring 281, and this spring likewise serves to hold the pawl 270A down in the normal position mentioned above.

At the end corresponding to the tie bar 211, the plate 270 includes a rearward extension 285, Fig. 13, and this extension is suitably connected to the armature 286, Fig. 15A, of the solenoid SOL–1.

When the solenoid SOL–1 is energized, the plate 270 is lifted against the coil springs as 281, and this disengages the pawl 270A from the notches 271 in the three aforementioned plates 220 that are allocated to the last eighteen columns of punches. This occurs before selected of the punches are to be operated, so that when the release bail 250 is relieved from the rear ends of the plates 220 that were locked by the pawl 270A these are freed to the action of a corresponding one of the springs 265. This spring is the spring 265A, Figs. 8 and 15A, which shifts the three plates 220–10–4–4 to suppression position, Fig. 15A, whereat the recesses 222 and 223 thereof are aligned with the cross heads accounting for punch suppression in the last eighteen columns of card LC.

For controlling suppression in the first eleven columns of the punches so that the card TC following the card LC at the punching station will not be punched in these columns, a second control plate 290 is afforded, and this plate is provided with a pawl 290A which normally engages notches as 291, Fig. 13, which are formed in the plates 220 that are allocated to suppression of the first eleven columns of punches. Thus, as indicated in Figs. 9 and 16A, a single ten column plate 220–10 and a single one column plate 220–1 are arranged side by side adjacent the tie bar 211.

The control plate 290 at either end, as shown in Fig. 8, includes short arms 293 and 294, and these are yieldably engaged by coil springs as described above to normally hold the pawl 290A in the notches 291 as aforesaid so that normally the punches in the first eleven columns will be actuated.

A solenoid SOL–2 is adapted to control the plate 290, and to this end the plate 290 includes a rearwardly extending arm 295, Fig. 13, which is connected to the armature 296 of the solenoid SOL–2. Accordingly, when the solenoid SOL–2 is energized plates 220–10 and 220–1 corresponding to the first eleven columns of punches are freed to the action of the corresponding spring 265, and in Figs. 8 and 16A such is represented by the spring 265B.

As shown in Fig. 8, there is a third spring 265C interposed between the springs 265A and 265B. It will also be observed in this same connection that there is no other holding pawl between the holding pawls 270A and 290A. Therefore, the intermediate plates 220 between the plates 220 corresponding to the pawls 270A and 290A are at all times free to be shifted to suppressing position, that is, the eleven intermediate columns as indicated in Figs. 15B and 16B are biased for continuous suppression so that there is no punching in these columns for either card LC or TC. This biasing of the intermediate plates 220 is shown in Figs. 8 and 9. Thus the bail 250 has been released so that the spring 265C is effective to shift the aforementioned intermediate plates 220 to suppressing position, and under such circumstances the notches 222 and 223 thereof will be aligned with respect to the cross heads 217 and 218 so that when the ram is operated there will be no actuation of the punches in the intermediate columns even though interposers have been set in these columns. It will further be observed in Figs. 8 and 9 that the springs 265A and 265B are tensioned, which is to say that neither solenoid SOL–1 nor SOL–2 was energized and therefore the pawls 270A and 290A remained in holding position, and under this circumstance, which is for purposes of illustration, a card in the punching station would be punched both in the first eleven columns and in the last eighteen columns depending upon the particular setting of the interposers for selection of the punches be actuated.

In accordance with the present invention, the solenoids SOL–1 and SOL–2 when both are active are alternately energized in one cycle of revolution of the main cam shaft CS–2, positioning and punching of the two cards LC and TC being performed within this cycle. Switches 300 and 301, Figs. 9, 15A and 16A, are wired to a terminal plate 305 so as to afford individual circuits for the two solenoids SOL–1 and SOL–2 as shown in Figs. 15A and 16A. Thus when either switch 300 or 301 is closed this then conditions the corresponding solenoid for operation.

Reference has been made hereinabove to the main cam shaft CS–2 of the machine described in Patent No. 2,710,406, and as there explained this cam shaft times the operation of many of the cam switches that are operative during the course of operation of the machine. Accordingly, energization of the solenoids SOL–1 and SOL–2 is controlled by cams 310 and 311, respectively, Figs. 15A and 16A, that are mounted on the cam shaft CS–2. Associated with the cams 310 and 311 are normally open switches 310S and 311S. Each cam is provided with a lobe 310L and 311L, and the normal position for these cams is substantially that indicated in Figs. 15A and 16A. During a cycle of rotation of the cam shaft CS–2, the lobe of cam 310 is first effective to close the switch 310S, it being assumed that switch 300 has been closed. Solenoid SOL–1 is thereupon energized. In the meantime, the card LC has been positioned at the punching station and the interposers have been set on selected of the punches 127. Early in the cycle, the release bail 250 was shifted clockwise as will be observed in Fig. 15A, thereby conditioning the plates 220 for shifting to suppressed position, so that upon energization of solenoid SOL–1 as mentioned above to lift the pawl 270A to the position shown in Fig. 15A the desired punch suppressing condition has been established prior to operation of the punch ram. It will be appreciated of course that in Figs. 15A and 16A the solenoid circuits are shown in normal position and that these circuits were completed or closed to account for the shifted position of the plates 220 in each instance.

After card LC has been punched, the punches that where active are restored to reestablish the original punch selection, and card LC is fed out of the punching station. It may now be pointed out that where both solenoids SOL–1 and SOL–2 are active in a cycle, the plates 220 that were shifted to punch suppressing position for card LC are restored before card TC arrives at the punching station. This is accomplished by a second cam 261A, Fig. 8, for controlling the bail 250 arranged on the cam shaft CS–2 at the side of cam 261. This second cam is associated with a follower that is co-axial with the follower 260 on the control cam 255, and the arrangement is such that the cam 261A is effective on its follower to shift the restoring bail 250 forwardly to restore the plates 220 that were shifted rearwardly for suppressing punching in selected columns of card LC. In the meantime, SOL–1 was deenergized so that when card TC is at the punching station all plates 220 are locked up in normal position.

After the foregoing restoration has been accomplished by cam 261A, continued rotation of the shaft CS–2 carries cam 261A quickly past its follower to again release the bail 250 relative to the plates 220. Then, near the end of the cycle where card TC is at the punching station, cam 311 closes its switch 311S, solenoid SOL–2 is energized (switch 301 being closed), whereupon pawl 290A is elevated to the position shown in Fig. 16A, and the plates 220–10–1, Fig. 16A, allocated to suppressing punching in the designated columns of card TC shift to suppressing position. The ram for the punches is again operated, and card TC is punched by those of the punches that are in unsuppressed columns. At the end of the cycle, cam 261 is effective to restore the bail 250 and with it the plates 220–10–1, Fig. 16A, and the interposers as 136 are restored or zeroized to undergo a new setting for punching the next two cards arriving in sequence at the punching station in the next cycle of the machine operation.

While particular emphasis has been directed to cards LC and TC under assumed column conditions, it will be appreciated that this is but exemplary, and moreover a special circumstance has been described, namely, one wherein intermediate columns common to both cards are biased for suppression in each instance. It is likewise possible to enable punching to be accomplished in columns common to both cards while suppressing punching in different columns, and the various permutations of these examples are obvious. Thus, where there is to be punching in columns common to both cards there will be control pawls as 270A and 290A having portions common to selected of the plates 220, such being possible due to two spaced apart sets of notches 271 and 291 in each of the plates 220. Thus, where there is a plate 220 having overlapping pawls, and upon elevation of one such pawl to enable suppression to be accomplished in certain columns at one time in the cycle, the plate 220 that is overlapped will nevertheless remain held in normal or punch operating position by the remaining pawl which is down in holding position at this time.

It will be recognized that where two cards as LC or TC are both to receive the same data from the punches selected to be active, then both the switches 300 and 301 will be opened so that all selected punches will be active on both cards to punch identical data therein. Further, if there is to be punch suppression only with respect to one of the two cards sequenced in repeated cycles to and through the punching station, then only one solenoid SOL–1 or SOL–2 will be conditioned for operation by closing the corresponding switch 300 or 301. For instance, if card LC is to be punched by all the selected punches, and card TC to receive but a portion of the data punched in card LC, then the circuit for solenoid SOL–1 will be rendered inoperative and solenoid SOL–2 alone conditioned for operation.

It will be seen from the foregoing that the present invention affords wide variation for selective suppression of punches in columns otherwise operative when established or selected to punch two or more cards with identical data from a single setting of the punches.

Hence, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In multiple-column selectively settable punching apparatus having a plurality of columns of punches with a plurality of punches in each column, interposer means for each of said columns individually settable for determining and selecting the punches to be actuated in the respective columns, a main ram plate for imparting punch operating movement to certain of said interposers, and a supplemental ram plate normally connected to said main ram plate for imparting punch operating movements to other of said interposers, actuating means for imparting punch operating movement to said main ram plate, and means effective to disconnect said supplemental ram plate from said main ram plate to thereby suppress operation of said other of said interposers.

2. In multiple-column selectively settable punching apparatus having a plurality of columns of punches with a plurality of punches in each column, interposer means for each of said columns individually settable for determining and selecting the punches to be actuated in the respective columns, a pair of ram plates one of which is operable upon certain of said interposers and the other of which is operable upon other of said interposers, and means for operating said one of said ram plates alone or for operating said ram plates in unison.

3. In a machine for producing business instruments, a sheet guideway having sheet feeding means associated therewith for advancing sheets along said guideway, a settable punching unit disposed along said guideway for effecting punching operations in a plurality of columns on a sheet disposed at a punching position in said guideway, stop finger means for stopping each sheet in said punching position and including a cam shaft and cam means for actuating such stop finger means, means operable after said punching unit has been set for disabling said punching unit in certain of said columns, and means operated by said cam shaft for rendering said disabling means effective.

4. In a machine for producing business instruments, a sheet guideway having sheet feeding means associated therewith for advancing sheets along said guideway, multiple column selectively settable punching apparatus disposed along said guideway for effecting punching operations in a plurality of columns on a sheet disposed at a punching position in said guideway, said apparatus having a plurality of columns of punches with a plurality of punches in each column, interposer means for each of said columns individually settable for determining and selecting the punches to be actuated in the respective columns, stop finger means for stopping each sheet in said punching position and including a cam shaft and cam means for actuating such stop finger means, a main ram plate for operating certain of said interposers through punch operating movements, a supplemental ram plate for operating other of said interposers through punch operating movements, connecting means normally connecting said supplemental ram plate to said main ram plate, means for actuating said main ram plate, means for disconnecting said connecting means, and means operated by said cam shaft for rendering said last mentioned means effective.

5. In a machine for successively producing individual business instruments such as accounting cards or the like of at least two different orders, a guideway in the machine for said business instruments, punches disposed at a punching station along said guideway for punching data in said business instruments, means to feed in recurring succession the business instruments of the different orders along said guideway to the punching station, settable means to select the punches to be actuated, means to actuate the selected ones of the punches when a business instrument of one of the orders is at the punching station, punch suppressing means to suppress actuation of selected of the punches when a business instrument of another order next following upon the instrument of the one order is at the punching station so that said next following instrument of such other order receives none of the data corresponding to the suppressed punches, and means automatically operable in recurring cycles timed to the recurring sequential feeding of the instruments of different orders to correspondingly alternate operation of the punch suppressing means.

6. In a machine for successively producing individual business instruments such as accounting cards or the like of different orders and varying with regard to data that may be punched therein, a guideway in the machine for said business instruments, punches arranged in columns at a punching station along said guideway for punching data in said business instruments, means to feed in recurring succession the business instruments of the different orders along said guideway to the punching station, interposer means individually settable in each column of punches to select the punches to be actuated, means to impart punch actuating movement to the interposers in set position when a business instrument of an order to receive all of the data of the selected punches is at the punching station, punch suppressing means movable from an inoperative to an operative position to disable certain of said interposers that were set for said business instrument having an order as aforesaid from undergoing punch actuating movement with respect to the associated punches when an instrument of another order immediately subsequent to the first-named instrument is at the punching station, and means for moving the punch suppressing means between operative and inoperative position in timed relation to the recurring succession of the instruments of the different orders arriving at the punching station so that the business instruments produced in the machine are of correspondingly varied order with respect to punched data contained therein.

7. In multiple column selectively settable punching apparatus having a plurality of columns of punches with a plurality of punches in each column arranged at a punching station for punching data in individual business instruments or the like advanced in sequence to the punching station, punch selecting means individually settable to select predetermined of the punches that are to be operative, means operative after predetermined of the punches have been selected by the settable punch selecting means to actuate the punches to punch corresponding predetermined data in a first one of the instruments advanced to the punching station, means to maintain the setting of the punch selecting means as aforesaid for punching a second one of the instruments advanced to the punching station, means to suppress actuation of at least some of the predetermined punches that would be operative on said second instrument so that said second instrument advanced to the punching station will receive less of the predetermined data that were punched in said first instrument, and means to alternate operation of the punch suppressing means in timed relation to the arrival of said business instruments at the punching station.

8. In multiple column selectively settable punching apparatus having a plurality of columns of punches with a plurality of punches in each column arranged at a punching station for punching data in individual business instruments or the like advanced in sequence to the punching station, interposer means settable in one cycle of the machine to select predetermined of the punches that are to be operative, means operative after the punches have been selected as aforesaid to impart punch actuating movement to the interposers in set position to cause predetermined data to be punched in a first one of the instruments advanced to the punching station in the same cycle, means to suppress actuation of certain of said interposers in set position as aforesaid so that certain of the punches are inoperative on a second one of the instruments advanced to the punching station in the same cycle, said interposers being restored after the punching of said second instrument in effect marking the end of said cycle, and means to alternate operation of the punch suppressing means in timed relation to the arrival at the punching station of said instruments in subsequent cycles as aforesaid.

9. In a machine having multi-column punching mechanism for punching data column-wise in cards or the like, a plurality of columns of punches, interposers settable in each such column to determine the punches that are to be active to punch a card, ram means to enable such active punches to be driven, a plurality of settable plates arranged between the ram means and the interposers and each spanning different columns of punches, said settable plates each being normally locked in position to be effective to transmit the force of said ram means to the interposers in set position in the columns of punches corresponding to said plates, means to enable selected of the settable plates when unlocked to shift from a normal position to punch suppressing position so as to be ineffective to transmit the force of the ram means to the interposers in set position as aforesaid so that not all of said active punches are actuated, and control means for said settable plates alternately operative to unlock at alternate times selected alternate ones of said plates.

10. In a machine having multi-column punching mechanism for punching data column-wise in cards or the like passed in sequence through the machine to the punching mechanism, punches arranged in a plurality of columns and adapted in each column to be selected individually for operation, means to enable the selected punches to operate in like manner with respect to punching data in two successive cards or the like, means effective to transmit an operating force to the selected punches when the first one of such two cards or the like to be punched is at the punching mechanism, means to suppress operation of said selected punches in certain columns when the other of such two cards or the like next to be punched is at the punching mechanism, and means to alternate operation of the punch suppressing means so that said punch suppressing means is operative to suppress punches in said certain columns only with respect to alternate cards arriving at the punching mechanism.

11. In a machine having multi-column punching mechanism at a punching station for repeatedly punching data column-wise in cards or the like passed in sequence to the punching station, punches arranged in a plurality of columns and adapted first to be selected individually in certain columns for active unsuppressed operation on one of such cards positioned at the punching station, means operative after such selection to suppress operation of the punches in certain of the columns, otherwise active as aforesaid, on another one of such cards positioned at the punching station following the first-named card, and means to control the punch suppressing means so that said suppressing means is alternatively operative only on succeeding ones of such other cards repeatedly arriving at the punching station.

12. In a machine having multi-column punching mechanism at a punching station for repeatedly punching data column-wise in cards or the like passed in sequence to the punching station, punches in a plurality of columns and adapted to be selected individually for active unsuppressed operation in certain columns, punch suppressing means settable at one time after selection of the punches to suppress operation of certain ones of the selected punches while remaining ones of the selected punches remain active to punch a card, like punch suppressing means settable at another time to suppress operation of certain other of said selected ones of the punches while remaining of said selected punches remain active, and means to alternate operation of the first and second-named punch suppressing means between repeated selections of the punches as aforesaid.

13. In a machine having multi-column punching mechanism at a punching station for repeatedly punching data column-wise in cards or the like passed in sequence to the punching station, punches in a plurality of columns and adapted to be selected individually for active unsuppressed operation in certain columns, suppressing means settable at one time after selection of the punches as aforesaid to suppress operation of certain ones of said selected punches while remaining ones of said selected punches remain active to punch one card, said active punches being restored after operation on said one card to reestablish the original punch selection, like punch suppressing means next settable to suppress operation of certain of the reestablished punches while remaining ones of said reestablished punches remain active on the next card, and means to alternate operation of the first and second-named punch suppressing means with respect to repeated sequencing of the cards.

14. In a machine having multi-column punching mechanism for punching data column-wise in cards or the like, a plurality of columns of punches, means to select the punches in columns normally to be operative, means to operate the selected of the punches to punch corresponding data in a card, settable means corresponding respectively to different columns of punches and being normally effective in one relation to enable the punch operating means to operate such selected punches, said settable means each being adapted to be set in another relation to prevent operation of the selected punches in the columns corresponding thereto, and means to repeatedly alternate the respective settable means between the two relations therefor.

15. In a machine having multi-column punching mechanism at a punching station for repeatedly punching data column-wise in cards or the like passed in sequence to the punching station, a plurality of columns of punches, interposers settable in each such column to determine the punches normally to be active, ram means to enable such active punches to be driven, a plurality of settable punch suppressers acting between the ram means and the interposers and each allocated to different columns of punches, said settable suppressers each being releasably set normally in position to be effective to enable the force of said ram means to be imparted to the interposers in set position in the columns of punches corresponding to said suppressers, means to enable the settable suppressers when released to prevent transmission of the force of the ram means to the interposers in set position in corresponding columns as aforesaid so that not all of said active punches are actuated, and control means for said settable suppressers operative in timed relation to the sequencing of said cards to release at different times selected of said suppressers.

16. In a machine having multi-column punching mechanism at a punching station for repeatedly punching data column-wise in cards or the like passed in sequence to the punching station, a plurality of columns of punches, means to select the punches individually for active unsuppressed operation, ram means to enable such active punches to be driven, a plurality of settable punch suppressers acting between the ram means and said punch selecting means and each being allocated to different columns of punches, said suppressers each being normally in position to be effective to enable the force of said ram means to be transmitted to the active punches in columns corresponding to said suppressors, means to enable the suppressers to assume punch suppressing position to prevent operation of punches in the columns corresponding to the suppressers in punch suppressing position, and means for controlling individually the position of said suppressers.

17. In a machine having multi-column punching mechanism at a punching station for repeatedly punching data column-wise in cards or the like passed in sequence to the punching station, punches in a plurality of columns and adapted to be selected individually for active operation in certain columns that are identical for at least two cards arriving successively at the punching station one after another, means operative at one time after the first of such two cards has reached the punching station to operate certain of said active punches to punch said card with corresponding data, said certain punches being restored after operation on said first card to reestablish the original punch selection for the second of such two cards, punch suppressing means next settable to suppress operation of certain of the reestablished punches while remaining ones of said reestablished punches remain active for punching said second card, and means to repeatedly set the punch suppressing means as aforesaid for such second cards repeatedly arriving at the punching station and which are to receive less of the data punched in the companion first cards.

No references cited.